United States Patent [19]

Lempa, Jr.

[11] Patent Number: 4,709,505

[45] Date of Patent: Dec. 1, 1987

[54] HERBICIDE APPLICATOR APPARATUS

[76] Inventor: B. J. Lempa, Jr., A & M Rte., Box 66, Cuero, Tex. 77954

[21] Appl. No.: 579,507

[22] Filed: Feb. 13, 1984

[51] Int. Cl.$^4$ ............................................. A01G 13/00
[52] U.S. Cl. ........................................... 47/1.7; 47/1.5
[58] Field of Search .................... 47/1.7, 1.43, 1.5; 239/576, 577, 579; 222/465, 463, 529, 181; 251/294, 341, 348, 349, 354

[56] References Cited

U.S. PATENT DOCUMENTS

| 2,149,584 | 3/1939 | Davis | 239/576 |
| 2,704,622 | 3/1955 | Soffer | 251/349 |
| 3,016,653 | 1/1962 | Gardner | 47/1.7 |
| 4,206,569 | 6/1980 | Randolph | 47/1.7 |
| 4,459,777 | 7/1984 | Moore et al. | 47/1.5 |

Primary Examiner—Robert A. Hafer
Assistant Examiner—Bradley M. Lewis

[57] ABSTRACT

A farm tractor drawn device that when pulled over undesirable plants such as weeds and brush, will detect and automatically spot spray any liquid herbicide solution onto the individual plant, and will therefore economically elliminate the individual plants without having to broadcast apply the herbicide solution over an entire area.

17 Claims, 17 Drawing Figures

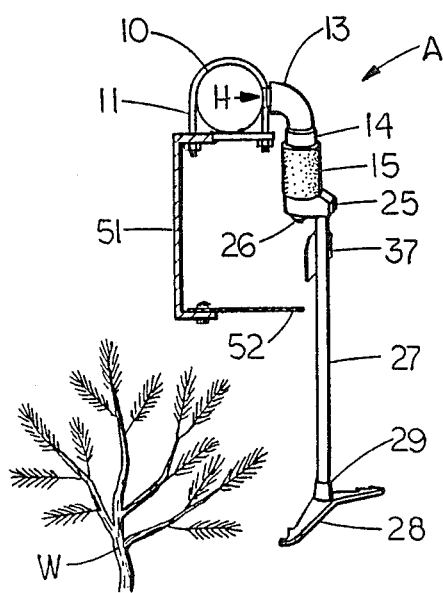
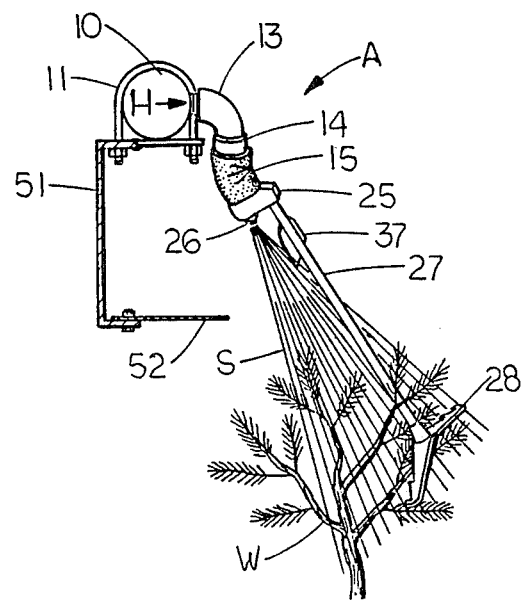
FIG. 2A  FIG. 2B
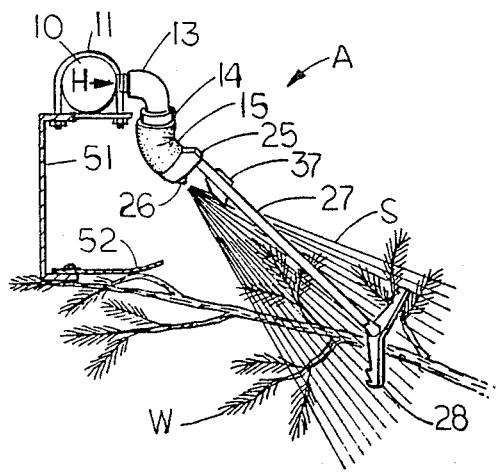
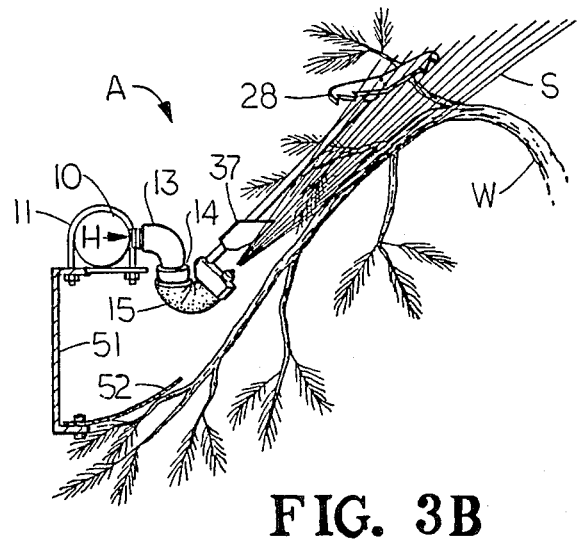
FIG. 3A  FIG. 3B
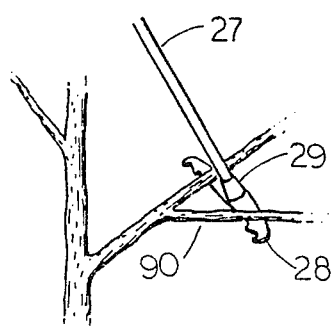
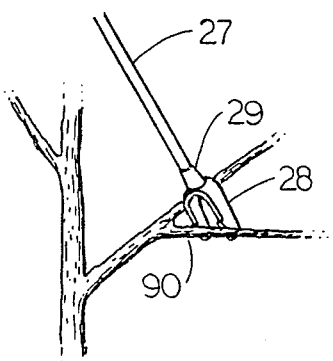
FIG. 4A  FIG. 4B

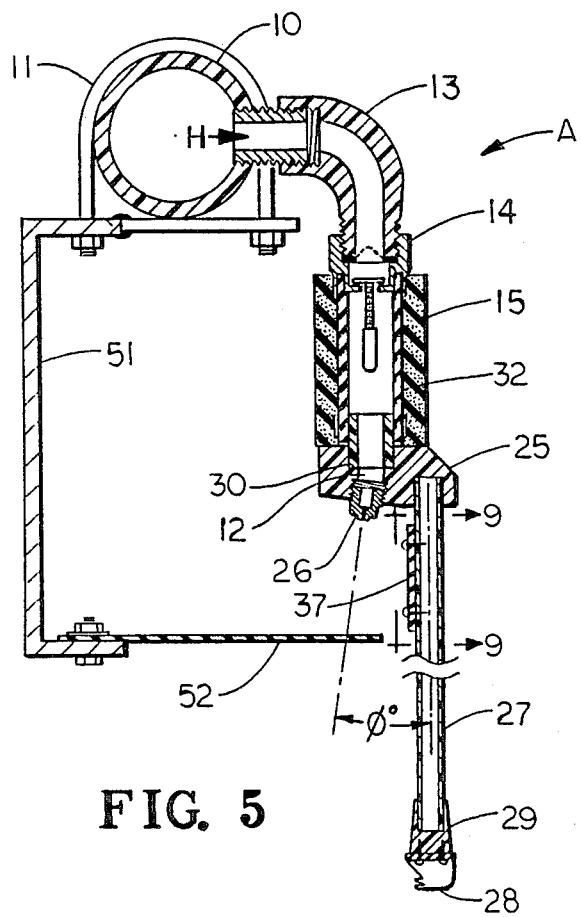
FIG. 5
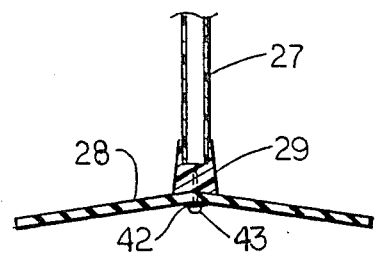
FIG. 7
FIG. 8
FIG. 9
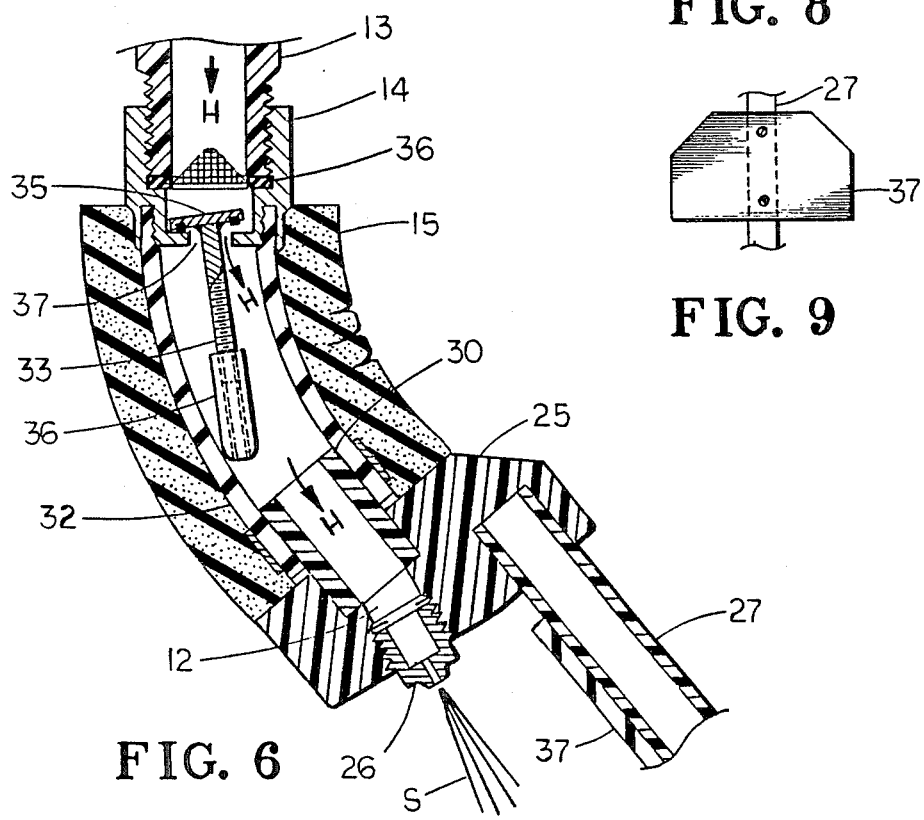
FIG. 6

HERBICIDE APPLICATOR APPARATUS

BACKGROUND OF THE INVENTION

The present invention is a device used to automatically spot spray any desired herbicide solution onto individual stands of undesirable plants such as weeds, brush and certain types of undesirable coarse grass.

One of the main concerns of the cattle producing rancher is to provide for maximum grass production. The most efficient and lasting means by which to increase grass production is to elliminate the brush and weed that compete for soil moisture and sunlight.

In certain areas the brush is so thick and tall that it must be removed by such means as a bulldozer or sprayed with herbicide by means of aircraft. But often the rangeland is not completely covered with brush or weed. Instead, the coverage is spotty. Such spotty coverage is presently treated in a number of ways.

Some ranchers treat individual stands of brush with various types of hand held spray guns. The herbicide solution can be applied in economical quantities by hand but this method is so time consuming that it is often limited to only very small areas. Other ranchers use a broadcast spray rig that is pulled behind a farm tractor. This unit has a pump that provides a constant high pressure flow of herbicide through either a single high volume cluster nozzle or through a number of spray nozzles arranged along a boom or header.

But, the broadcast spray rig method sprays 100% of the range surface area even if, for example, only 10% of the surface area is spotted with brush or weed. Because such a large quantity of the costly herbicide solution is wasted by this method, it is generally considered cost-prohibitive for brush control.

Along commercial fruit and nut orchard bottoms weeds and grass must be elliminated because such growth competes for soil moisture. The broadcast spray rig is most often used to apply the herbicide over such areas but again, this method is wasteful over spotty weed and coarse grass coverage.

In addition, pipeline and powerline right-of-ways must be kept clear of undesirable growth so that maintenance crews can travel the right-of-way if trouble occurs and for general access. If such undesirable plant growth is not controlled during early stages, the growth will finally completely engulf the right-of-way such that travel by maintenance vehicles over the area is impossible. Generally, brush along such right-of-ways is sprayed with herbicide by hand gun from a specially rigged truck or mowed with heavy equipment year after year.

The present tractor drawn invention will automatically detect and spot spray liquid herbicide onto the individual stands of undesirable growth in a fast and economical manner.

OBJECTS OF THE INVENTION

The present invention has as one of its objects the provision of a farm tractor drawn device that detects and automatically spot sprays any liquid herbicide solution onto individual stands of undesirable plant growth thus elliminating herbicide waste and time consuming labor.

It is another object of the present invention to provide a device that conveniently attaches to a standard 3-point hitch behind a farm type tractor which therefore allows for the device to quickly be raised or lowered as required for the varying heights of plant growth encountered.

It is another object of the present invention to provide a device that utilizes a pump means and the necessary piping and plumbing to provide controlled herbicide solution transfer and pressurization from a holding tank to a header means that as a result provides pressurized solution at the independent automatic spray assemblies.

It is another object of the present invention to provide a device with a plurality of duplicate yet independently activated automatic spray assemblies, each assembly consisting of a plant growth detection (or snagging) means, an activation arm means, an attach block means, a valve means and a spray nozzle means.

It is another object of the present invention to provide a device wherein said spray nozzle means is mounted in conjunction with the activation arm means such that the direction of the discharged spray pattern has a characteristic to move with and therefore follow the path of plant growth as said growth passes beneath said device.

It is another object of the present invention to provide a device wherein the valve means of the automatic spray assemblies can be activated by any omni-directional movement of an activation arm and further wherein said valve means can conveniently be adjusted for herbicide flow activation sensitivity.

It is a further object of the present invention to provide a device that has automatic spray assemblies constructed of such materials that they are light in weight and therefore are less likely to produce activation arm movement over rough terrain which would inadvertently activate the valve means and cause flow of the herbicide solution.

It is a further object of the present invention to provide a device with automatic spray assemblies that are constructed of such materials and in such a way that the assemblies can temporarily flex in any required direction when extremely harsh plant growth is encountered and yet return to the normally vertical position without damaging any component thereof.

It is another object of the present invention to provide a device that utilizes a beam on which a header means is mounted, said beam having sufficient depth below the header to provide adequate distance between the spray nozzles and passing plant growth in order to insure that the pressurized herbicide solution has adequate travel distance to develop into the desired spray pattern before coming in contact with the foliage of the passing plant growth.

It is a further object of the present invention to provide a device wherein common state of the art valve means may be utilized in order to reduce costs and add to the simplicity of the automatic spray assemblies.

The objects set forth as well as others will become clear from the following descriptions.

BRIEF DESCRIPTION OF THE DRAWINGS

FIG. 2A is a partial sectional perspective side view showing an automatic spray assembly in the normal position.

FIG. 2B is a partial sectional perspective side view showing an automatic spray assembly in the activated spraying position over plant growth.

FIG. 3A is a partial sectional perspective side view showing an automatic spray assembly and the beam as they encounter a tall tree-like plant.

FIG. 3B is a partial sectional perspective side view showing an automatic spray assembly in an extreme position as a tall treelike plant momentarily passes by.

FIG. 4A is a perspective view showing the plant detection means as it approaches a forked branch of a plant.

FIG. 4B is a perspective view showing the plant detection means and how it has the capability to temporarily fold back and therefore pass through a forked branch situation.

FIG. 5 is a cross-sectional side view showing an automatic spray assembly as it attaches to the header and as the header is arranged on the beam.

FIG. 6 is a partial cross-sectional side view showing the preferred valve means, attach block and nozzle in the activated or spraying position.

FIG. 7 is a plan view showing the preferred shape of the plant detection means.

FIG. 8 is a cross-sectional view taken on lines 8—8 of FIG. 7 showing the plant detection means and its approximate pre-shaped angle.

FIG. 9 is a cross-sectional view taken on lines 9—9 of FIG. 5 showing the anti-spray shield.

DETAILED DESCRIPTION OF THE INVENTION

Figure 1:
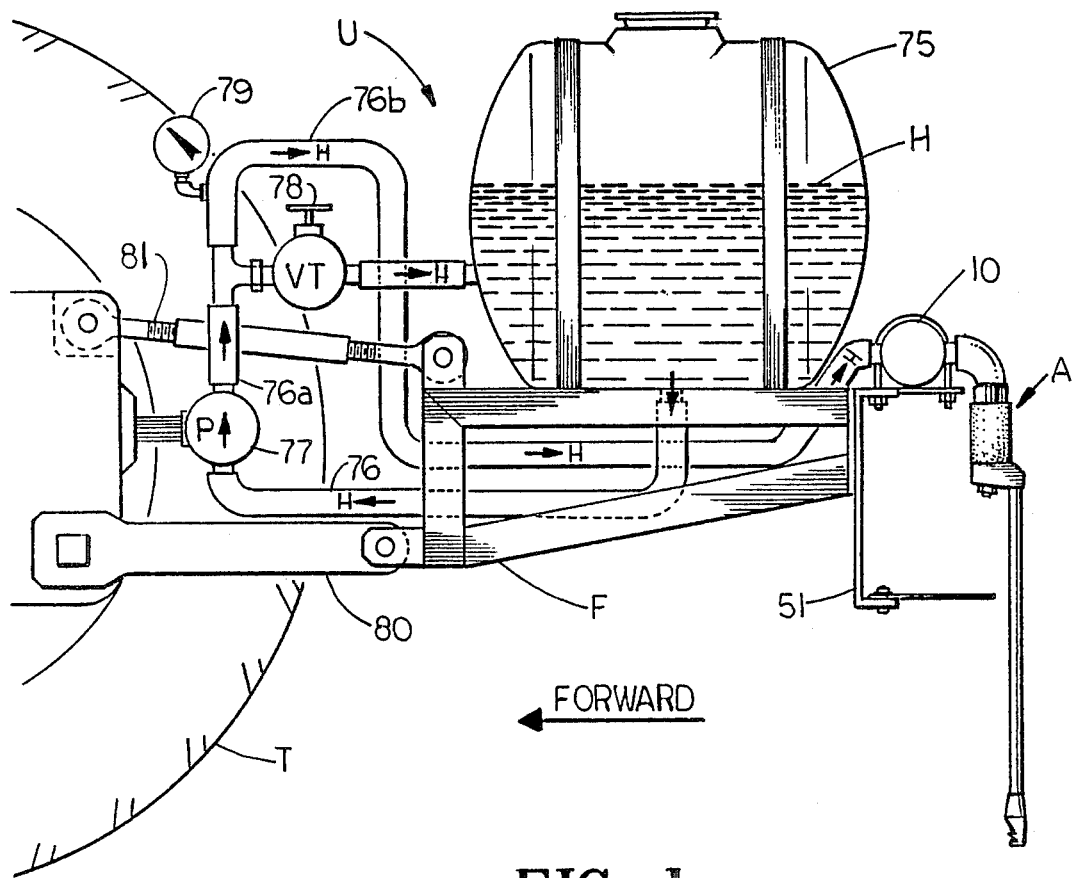
FIG. 1 is a side view of the invention showing the basic frame as it attaches to a farm tractor and a diagram showing how the solution is transferred from the herbicide tank to the header.
Figure 1A:
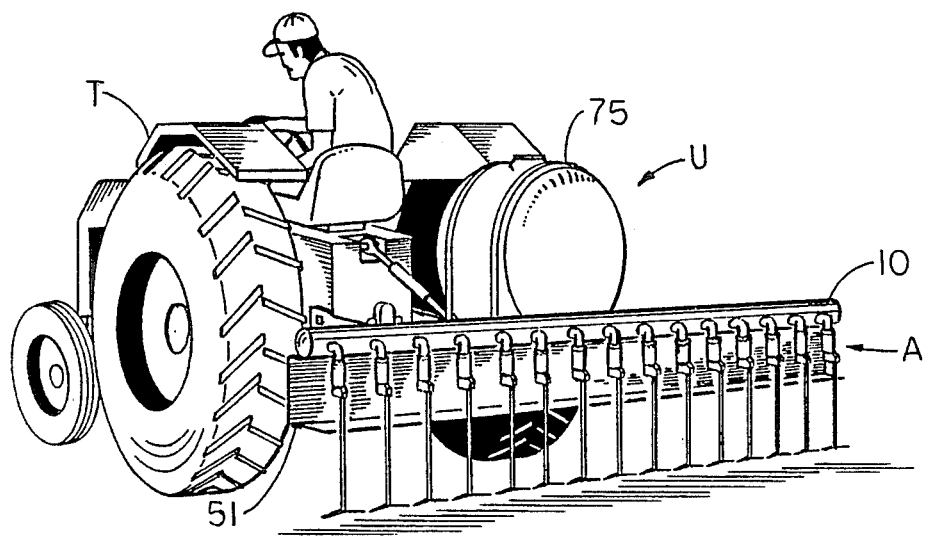
FIG. 1A is a perspective view of the invention as attached to a farm tractor.
Figure 10:
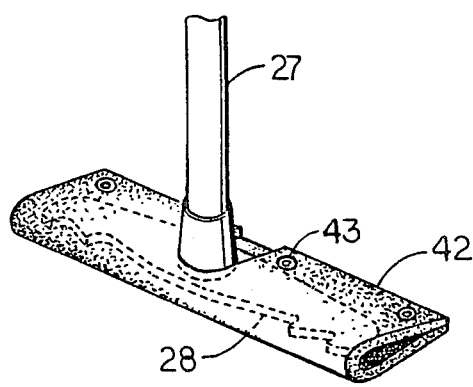
FIG. 10 is a perspective view showing the plant detection means with an alternate felt-like pad in position.

Reference is made to FIGS. 1 and 1A wherein a herbicide applicator apparatus U, according to the present invention, is illustrated. The apparatus U consists of a horizontal beam 51, on top of which is attached a header 10. Attached to the header 10 at approximately 5 inch intervals are automatic spray assemblies A. The horizontal beam 51 is attached to the frame F. On top of frame F is attached a holding tank 75. The frame F is attached to the standard 3-point hitch of the tractor T by means of a central arm 81 and two outer arms 80.

Herbicide solution H is transferred from the tank 75 and pressurized to the header 10 in the following manner. The pump 77 transfers solution H through the section tube 76. The pump 77 discharges the solution H through discharge tube 76a. The throttle valve 78 allows the operator to adjust the amount of solution H that is to be recirculated to the tank 75. As a result, the desired discharge pressure can be observed on the pressure gauge 79. The solution H under the desired pressure is thusly transferred to the header 10 through the discharge tube 76b.

With particular reference to FIGS. 1A, 2A, 2B, 5 and 6 the operation of the herbicide applicator apparatus U may be readily understood. As the apparatus U is pulled over a stand of undesirable plant growth W by the tractor T, the plant detection means 28 makes contact with the passing plant W. Resistance of the passing plant W against the detection means 28 causes a swinging back motion of the activation arm 27 as shown in FIG. 2B. Therefore, the force of this motion is transmitted through the attach block 25 and the connector tube 30 to the flexible (rubber hose) valve shaft 32 as shown in FIG. 5.

This swinging back motion and the force created thereby causes the flexible valve shaft 32 to bend. As shown in FIG. 6, the inside wall of the bending valve shaft 32 now makes contact with the sensitivity adjustment nut 36. As the force against the nut 36 from the valve shaft 32 increases, the force is transmitted through the activation rod 33 which causes the valve wafer/seal 35 to lift from the valve body 14. (The activation rod 33 and valve wafer/seal 35 are rigidly connected.) As the valve wafer/seal 35 lifts from the valve body 14, the pressurized herbicide solution H is allowed to flow through the orifice 37, and further through the tubular flexible valve shaft 32, and further through the connector tube 30 and further through the attach block 25 orifice 12, and further through the nozzle 26 and further as a spray S onto the foliage of the passing undesirable plant W.

It should be noted that possibly the most important feature of the automatic spray assembly A as described lies in the flexibility of assembly A and in the fact that the nozzle 26 is mounted in conjunction with the activation arm 27 in such a way that the direction of the discharged spray S of solution H has a characteristic to momentarily move back with and therefore follow the path of the plant growth W as it passes beneath and beyond the apparatus U. This characteristic insures that most of the herbicide solution H is deposited on the plant W which greatly reduces solution H waste. If the nozzle 26 were instead rigidly connected by some arrangement to possibly the bottom of the header 10, for example, it can easily be visualized that much of the sprayed solution H would not be aimed directly at the plant W and would therefore be wasted. The assembly A is activated by and will spray any plant W regardless of what direction the plant W passes by in relation to the assembly A. The spray S of the assembly A, and the related activation thereof is therefore omnidirectional.

As the applicator apparatus U continues to be pulled over the plant W by the tractor T, the plant W finally passes beyond the reach of the detection means 28. Simultaneously, with an abscense of plant growth W resistance against the detection means 28, the activation arm 27 immediately returns to its normal substantially vertical position, the flexible valve shaft 32 returns to its normal tubular shape, force against the adjustment nut 36 is relieved, the activation rod 33 returns to its normal vertical position, and the rigidly connected valve wafer/seal 35 re-seats against the valve body 14 and as a result the flow and spray S of a pressurized herbicide solution H instantly stops.

The return of the automatic spray assembly A to its normal substantially vertical position after the plant W has passed is caused by a combination of elastic memory prevalent in the rubber hose-like valve shaft 32 and in the foam rubber shroud 15 in addition to gravitational force acting upon the weight of the assembly A.

As shown in FIG. 3B the automatic spray assembly A must possess enough flexibility to swing back past the horizontal position to an almost upright vertical position when certain tree-like plant growth W is encountered, and then return to the normal position without damage to any component thereof. After such plant growth W has passed, the spray assembly A at times may have a tendency to return to its normal substantially vertical position so abruptly that it will actually swing forward and beyond the normal position for a brief moment and cause enough bending in the valve body 32 to cause a brief spray S of solution H even though the plant W has already passed. This characteristic and excessive forward movement of the assembly A is elliminated by the presence of the bumper pad 52.

The pad 52 is a continuous strip of flexible material such as rubber, affixed to the beam 51, that has enough rigidity to stop momentary excessive forward travel of the assembly A, yet flexible enough to allow the activation arm 27 to swing toward the beam 51 in such a position that the pad 52 folds back enough to allow the activation arm 27 to make contact with the beam.51. In this way the assembly A will be less likely to be damaged in the event that the apparatus U is passed over a thick undesirable plant W in a rearward instead of a normal forward travel direction.

The importance of adequate depth in the beam 51 must be emphasized. As the tall tree-like plant W passes, it will have a tendency to lay flat as shown in FIG. 3A. The beam 51 must be of sufficient depth to provide adequate clearance between the foliage of the plant W and the nozzle 26 to insure that the spray S of herbicide solution H has the necessary distance to obtain its desirable width and spray pattern characteristic. If the beam 51 were of insufficient depth, under the condition as shown in Figure 3A, the foliage of the plant W would pass so close to the nozzle 26 that the spray S would not have the necessary travel distance required to disperse into a wide, full coverage pattern of solution H. As a result, the plant W would receive only a narrow, almost solid stream of solution H as opposed to a wide pattern as desired.

The interchangable nozzle 26 would most often be of a design that produces a flat-fan pattern of spray S. The nozzle 26 of this configuration would be positioned in such a way that the flat pattern spray S would be emitted parallel to the detection means 28. The angle $\phi$ of approximately 8° between the center line axis of the nozzle 26 and the center line axis of the activation arm 27, as shown in FIG. 5, will insure that the nozzle 26 does not emit spray S directly onto the detection means 28.

Over certain types of growth on the other hand, a nozzle 26 that produces a cone shaped pattern of spray S may be desired. The cone shaped pattern however would have a tendency to emit the spray S behind the activation arm 27 and to the rear of the desired area of distribution. To confine the rearward distribution of a cone shaped pattern, a spray shield 37 is required as shown in FIGS. 5 and 9. The thin, flexible spray shield 37 would be attached between the activation arm 27 and the nozzle 26 in a position parallel to the detection means 28.

The detection means 28 as shown primarily in FIGS. 4A, 4B, 7 and 8 must be of proper design configuration and be constructed of the proper material in order to function properly. The detection means 28 must be made of a flexible material, such as 3/16 inch thick rubber with a durometer of approximately 70, that has the capability to temporarily fold back as shown in FIGS. 4A and 4B so that it can pass through a forked branch 90 without becoming lodged or without damage to any related part thereof. On the other hand the detection means 28 must have enough rigidity to temporarily snag any passing plant growth W and cause the activation arm 27 to swing back adequately.

The detection means 28 should be of a desirable proportion, when viewed from above, such that its length is approximately six to seven times its width, the width being measured at the center line axis of the attach block 29. The detection means 28 should also have teeth 41 as shown in FIG. 7 on both ends thereof in order to promote the temporary snagging of passing plant growth W. The radii 40 inside the teeth 41 allow lighter growth such as grass to pass smoothly by without being snagged by the detection means 28.

The detection means 28 is fastened to the attach block 29 by a plurality of screws 43 and washers 42. It is important that the washers 42 be of a small diameter so as not to restrict the temporary folding back of the detection means 28 as shown in FIG. 4B.

As shown in FIG. 8, both ends of the detection means 28 slope downwardly from the center line axis of the activation arm 27 at an angle of approximately 10° in order to prevent an overlapping snagging tendency between the individual detection means 28 which have a clearance of approximately ½ inch between each as arranged on the herbicide applicator apparatus U. The detection means 28 and attach block 29 may be molded as a single piece thus elliminating the need of the screws 43 and washers 42.

Figure 13:
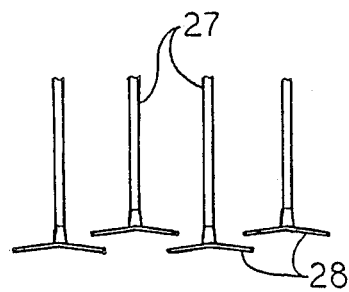
FIG. 13 is a rearward side view elevation showing an alternate arrangement of the plant detectionn means.

An alternate position arrangement of the detection means 28 is shown in FIG. 13. Instead of the detection means 28 having a clearance of approximately ½ inch between each, they are arranged such that they are overlapped one above and one below the other along the entirety of the applicator apparatus U. In this way no plant growth W can pass inbetween the detection means 28. This overlapping arrangement also inhibits the snagging tendency between the individual detection means 28.

As the applicator apparatus U is pulled over an area, at times an undesirable plant W is too small to offer enough resistance against the detection means 28 to cause the activation arm 27 to swing back and cause the valve wafer/seal 35 to unseat and allow pressurized herbicide solution H to pass as a spray S onto the plant W. For this condition a felt-like pad 42, as shown in FIG. 42, is wrapped around the detection means 28 and held in position by means of fasteners 43. After a short period of use, the absorbent felt-like pad 42 will become saturated with solution H as a result of the close proximity of the pattern of spray S. Therefore, when a very small undesirable plant W passes, even though it may not receive a spray S it will receive a wiped on coverage of the solution H.

Under certain field conditions the area may be covered not only with thick brush but also with weeds. If the user wishes to spray only the heavier growth and not the lighter weeds, he may do so by adjusting the activation sensitivity of the valve means in the following manner.

With reference to FIGS. 5 and 6, the valve body 14 and therefore the entire spray assembly A is unscrewed and removed from the elbow 13 to which the valve body 14 is threadably connected. With the assembly A now separated, the combination washer/screen 36 is removed. When the spray assembly A is turned to an inverted position, the assembly consisting of the wafer/seal 35, the activation rod 33 and the sensitivity adjustment nut 36 will gravitationally drop clear.

The user now inwardly screws the adjustment nut 36, which is threadably connected to the activation rod 33, to a position such that the total length of the assembly is substantially reduced. With the nut 36 in this position and all parts again assembled on the apparatus U, it can be visuallized in FIG. 6 that considerably more bending of the valve shaft 32, and greater resistance against the detection means 28 would be required in order to cause the valve wafer/seal 35 to unseat and therefore allow the pressurized herbicide solution H to pass as a spray S onto the undesirable plant W.

Therefore, the adjustment nut 36 may be inwardly (upwardly) positioned so that only the heavier plant growth causes solution H to flow through the valve and ultimately as a spray S, or the adjustment nut 36 may be outwardly (downwardly) positioned so that even the lighter growth such as weed will cause solution H to flow through the valve and ultimately be discharged as a spray S.

A different method can also be used to adjust the activation sensitivity of the valve means. If the user wishes to adjust the applicator apparatus U to discharge a spray S of solution H to primarily only the very coarse and heavier type brush and not lighter weeds, the U-bolts 11 are temporarily loosened and the header 10 rotated and repositioned such that all of the attached spray assemblies A are swung in a direction away from the beam 51 (rearward) to a position approximately 20° beyond the vertical. It has been found in the field, and it should easily be visualized from the drawings and particularly FIG. 6, that with the spray assemblies A positioned in such a manner considerably more resistance, or heavier plant growth forces, would be required to cause the flexible valve shaft 32 to bend and make contact with the sensitivity adjustment nut 36, and therefore cause the valve wafer/seal 35 to unseat and allow the flow of the pressurized herbicide solution H onto the passing plant W.

On the other hand, if the header is rotated and repositioned such that all of the attached spray assemblies A are swung in a direction toward the beam 51 (forward) to a position approximately 20° beyond the vertical, it has been found in the field that with the spray assemblies positioned in such a forward manner considerably less resistance, or lighter plant growth forces, are required to cause the flexible valve shaft 32 to bend and ultimately allow the flow of the pressurized herbicide solution H as a spray S onto the passing plant W.

Figure 11:
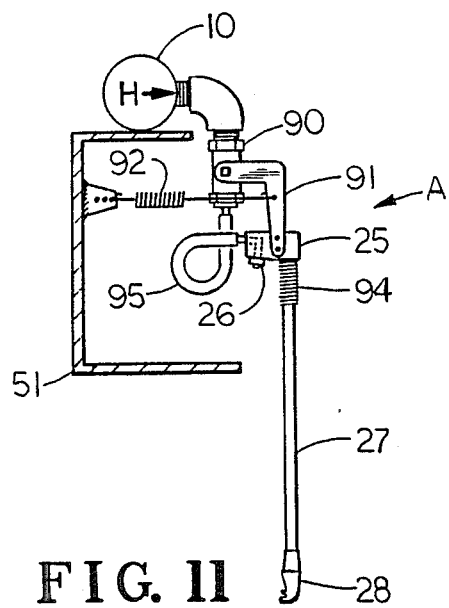
FIG. 11 is a partial sectional perspective side view showing an alternate arrangement whereby a common ball valve means is used.

FIG. 11 shows an alternate embodiment of an automatic spray assembly A wherein a common ball valve means 90 is used to control the flow of solution H. In this arrangement, the activation arm 27 again swings back when a passing plant W exerts pressure against the detection means 28. The resultant motion of the activation arm 27 causes a simultaneous rotation of an adapted valve handle 91 which is affixed to the attach block 25. The handle 91 in turn rotates the inner ported ball of the valve 90 in such a way that the pressurized solution H is allowed to flow through the outlet of the valve 90, and further through the flexible hose means 95, and further through the ported connector block 25 and therefore through the nozzle 26 as a spray S onto the passing plant W.

Immediately after the plant W has passed, the return spring 92 and the force of gravity cause the assembly A to return to its normal substantially vertical position which in turn closes the ball valve means 90 and which in turn causes the flow of solution H as a spray S to instantly stop.

Figure 12:
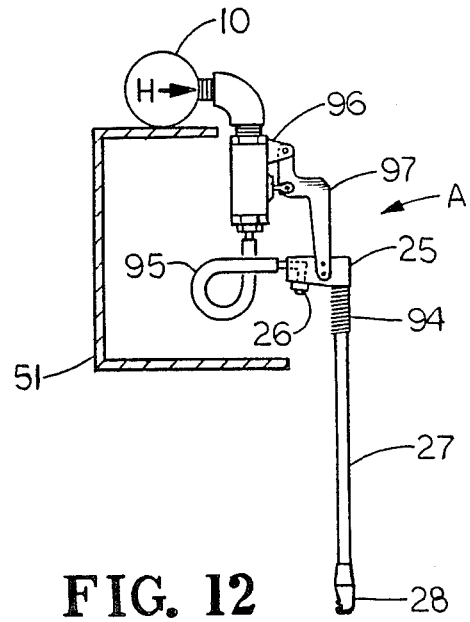
FIG. 12 is a partial sectional perspective side view showing an alternate arrangement whereby a common quick action gate valve (plunger valve) means is used.
Figure 14:
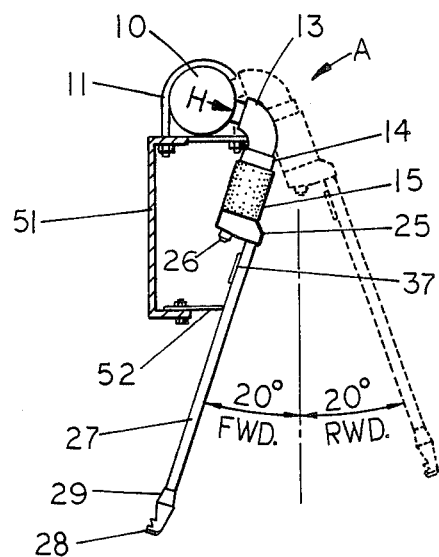

FIG. 12 further shows an alternate embodiment of an automatic spray assembly A wherein a common quick-action plunger valve 96 is used to control the flow of pressurized herbicide solution H. In this arrangement the activation arm 27 again swings back when a passing plant exerts pressure against the detection means 28. This motion in turn causes a simultaneous rotation of an adapted valve handle 97. The handle 97 in turn pulls the inner ported plunger (gate) of the valve 96 such that the solution H is allowed to flow through the outlet of the valve 96, and further through the flexible hose means 95 and further through the ported connector block 25 and therefore through the nozzle 26 as a spray onto the passing plant W.

Immediately after the plant W has passed, an inner return spring of the valve 96 and the force of gravity will cause the assembly A to return to its normal substantially vertical position which in turn closes the valve 96 and which in turn causes the flow of solution H as a spray S to instantly stop.

The alternate embodiments of the assembly A as shown in FIGS. 11 and 12 must have a semi-flexible link 94 located in a position very near the attach block 25 on the upper end of the activation arm 27. This semi-flexible link 94 must be made of a spring or any material that is rigid enough to transmit a sufficient force necessary to cause the valve handle to rotate, yet flexible enough to allow the activation arm 27 to temporarily fold back at the joint of the flexible link 94 when heavy plant growth is encountered without damaging any related component thereof. The limited rotational handle travel of a ball valve or plunger valve would result in damage to components if the semi-flexible link 94 were not utilized.

While the invention has been herein shown and described in what is presently conceived to be the most practical and preferred embodiment thereof, it will be obvious to those of ordinary skill in the art that many modifications thereof may be made within the scope of the invention, which scope is to be accorded the broadest interpretation of the appended claims, so as to encompass all equivalent structures and methods.

The invention claimed is:

1. Liquid herbicide spraying apparatus for mounting on a tractor to selectively detect and spray herbicide on unwanted plants including a frame for attaching said apparatus to said tractor, a tank mounted on said frame for carrying liquid herbicide, a header rotatably attached to said frame and transversely disposed with respect to the direction of travel of said tractor, means for transferring liquid herbicide from said tank to said header and maintaining pressure therein, and a plurality of moveable spray assemblies normally in a sustantially vertical position attached at spaced intervals along said header, each of said spray assemblies comprising:

valve means including a valve body, an inlet connected to said header, an outlet and a valve member movable, relative to said valve body, between a closed position and an open position;

a spray nozzle connected to said valve means outlet for directing liquid spray therefrom generally downwardly toward said unwanted plants but being mounted for at least limited omnidirectional radial movement relative to normal sustantially vertical position and activation means operatively connected to said valve means and said spray nozzle and normally depending downwardly therefrom for temporary engagement with said unwanted plants for, upon continuing travel of said tractor, temporary displacement thereof said displacement of said activation means resulting in displacement of said valve member and said nozzle, said displacement moving said valve member to said open position and radially displacing said spray nozzle to direct said spray therefrom directly toward the area of said engagement of said activation means with said unwanted plants.

2. Liquid herbicide spray apparatus as set forth in claim 1 including biasing means attached to said activation means for returning said activation means to a normal non-displaced position and moving said valve member to said closed position.

3. Liquid herbicide spraying apparatus as set forth in claim 1 including bumper means transversely attached to said frame and below said header for cushioning and limiting return movement of said activation means from a displaced position, upon disengagement from said unwanted plants, to said normal non-displaced position.

4. Liquid herbicide spray apparatus as set forth in claim 1 including a spreader beam means attached to and extending substantially below said header and further positioned parallel to and along the entire length of said header, said spreader beam comprising a rigid member depending downwardly from said header, the bottom edge of said rigid member for temporary engagement with said unwanted plants upon said continuing tractor travel so that a minimum distance is created between said unwanted plants and the bottom of said spray nozzle so that said spray therefrom will have the necessary distance required to disperse into the desired spray pattern thereby causing said spray to more uniformly cover said unwanted plants with said herbicide.

5. Liquid herbicide spray apparatus as set forth in claim 1 in which said activation means comprises a rigid elongated activator arm the uppermost end of which is operatively connected to said valve means and said spray nozzle and to the lowermost end of which is connected transversely disposed plant detector means for temporarily snagging said unwanted plants upon said continuing tractor travel and forcing said rigid activator arm to a temporarily displaced position to move said valve member to said open position and said spraynozzle to said radially displaced position.

6. Liquid herbicide spray apparatus as set forth in claim 5 in which said detector means comprises an elongated flat member, generally parallel to said header and the ends of which are provided with tooth means for better snagging of said unwanted plants, in which the axis of said flat member generally parallel to said header and the axis of said flat member midway between said ends and perpendicular to said axis generally parallel to said header are disposed perpendicular to the centerline axis of said activator arm.

7. Liquid herbicide spray apparatus as set forth in claim 6 in which said elongnated flat member is connected midway between said ends thereof to said activator arm and is of a material flexible enough to allow said ends of said flat member to temporarily fold back for passing through a restriction such as a forked plant branch without becoming wedged and lodged therein.

8. Liquid herbicide spray apparatus as set forth in claim 6 in which said elongated flat member is wrapped with an absorbent material for saturation by said liquid herbicide spray for wiping on said unwanted plants in addition to said spray thereon.

9. Liquid herbicide spray apparatus as set forth in claim 6 in which said ends of said elongated flat member overlap the ends of the corresponding flat member of an adjacent spray assembly so as to leave no gaps between said spray assemblies as said apparatus travels across an area with said tractor.

10. Liquid herbicide spraying apparatus as set forth in claim 1 in which said rotatably attached header means and said spray assemblies attached to said header may be rotated to a position such that;

said activation means normally depending downwardly therefrom and said spray assemblies are no longer depending downwardly but instead canted approximately twenty degrees beyond said downwardly position toward the direction from which said unwanted plants will approach upon said continuing travel of said tractor, said approximate twenty degree cant resulting in a decreased or therefore smaller, less dense plant growth force resulting from said temporarily snagging of said unwanted plant growth upon said continuing travel to cause the forcing of said activator arm to said temporarily displaced position to move said valve member to said open position and said spray nozzle to said radially displaced position, said activation means normally depending downwardly therefrom and said spray assemblies are no longer depending downwardly but instead canted approximately twenty degrees beyond said downwardly position opposite the direction from which said unwanted plants will approach upon said continuing travel of said tractor, said approximate twenty degree cant resulting in an increased or therefore larger, more dense plant growth force to cause the forcing of said activator arm to said temporarily displaced position to move said valve member to said open position and said spray nozzle to said radially displaced position.

11. Liquid herbicide spray apparatus as set forth in claim 5 including a flat shield means attached to said uppermost end of said activator arm positioned between said activator arm and said spray nozzle to restrict rearward spray of herbicide from said spray nozzle.

12. Liquid herbicide spray apparatus as set forth in claim 1 in which said valve body is a flexible tubular member which upon said displacement of said activation means is temporarily bent causing said valve means to be temporarily opened and said spray nozzle to be radially displaced to direct said spray therefrom directly toward the area of said engagement of said rigid activation means with said unwanted plants.

13. Liquid herbicide spray apparatus as set forth in claim 12 in which said valve member includes a wafer/seal for blocking said inlet in said closed position and an activation rod extending therefrom engageable by said flexible tubular body member upon said bending thereof by said displacement of said activation means to tilt said wafer/seal to a position unblocking said inlet and opening said valve for allowing liquid herbicide to flow through said spray nozzle.

14. Liquid herbicide spray apparatus as set forth in claim 13 in which said activation rod is provided with means for shortening or lengthening said rod to require more or less bending, respectively, of said tubular member to open said valve means.

15. Liquid herbicide spray apparatus as set forth in claim 12 in which the exterior of said flexible tubular member is encased circumferentially by a secondary tubular member having the resiliency of foam rubber and said secondary tubular member slightly stiffening said bending of said flexible tubular member thereby restricting said valve means from inadvertent opening when said activation means is displaced when said liquid herbicide spray apparatus is shaken upon said continuing travel over bumpy terrain.

16. Liquid herbicide spray apparatus as set forth in claim 12 including block means attached to the lower end of said flexible tubular member, said spray nozzle being removably attached to said block and communicating with said valve means through a port therein, said activator means including an elongated rigid activator arm the uppermost end of which is attached to said block means and the lower end of which is provided with plant detector means for said temporary engagement with said unwanted plants, upon said continuing travel of said tractor, for said temporary opening of said valve means and spraying through said spray nozzle in response to said temporary displacement of said activation means.

17. Liquid herbicide spray apparatus as set forth in claim 16 in which said elongated rigid activator arm is attached to said block means by a semi-flexible link member to prevent undue shock to said elongated rigid activator arm upon engagement with heavy plant growth.

* * * * *